April 8, 1958 C. H. TAYLOR 2,830,177
SIGNAL RECEIVER MUTING CIRCUITS
Filed April 28, 1955
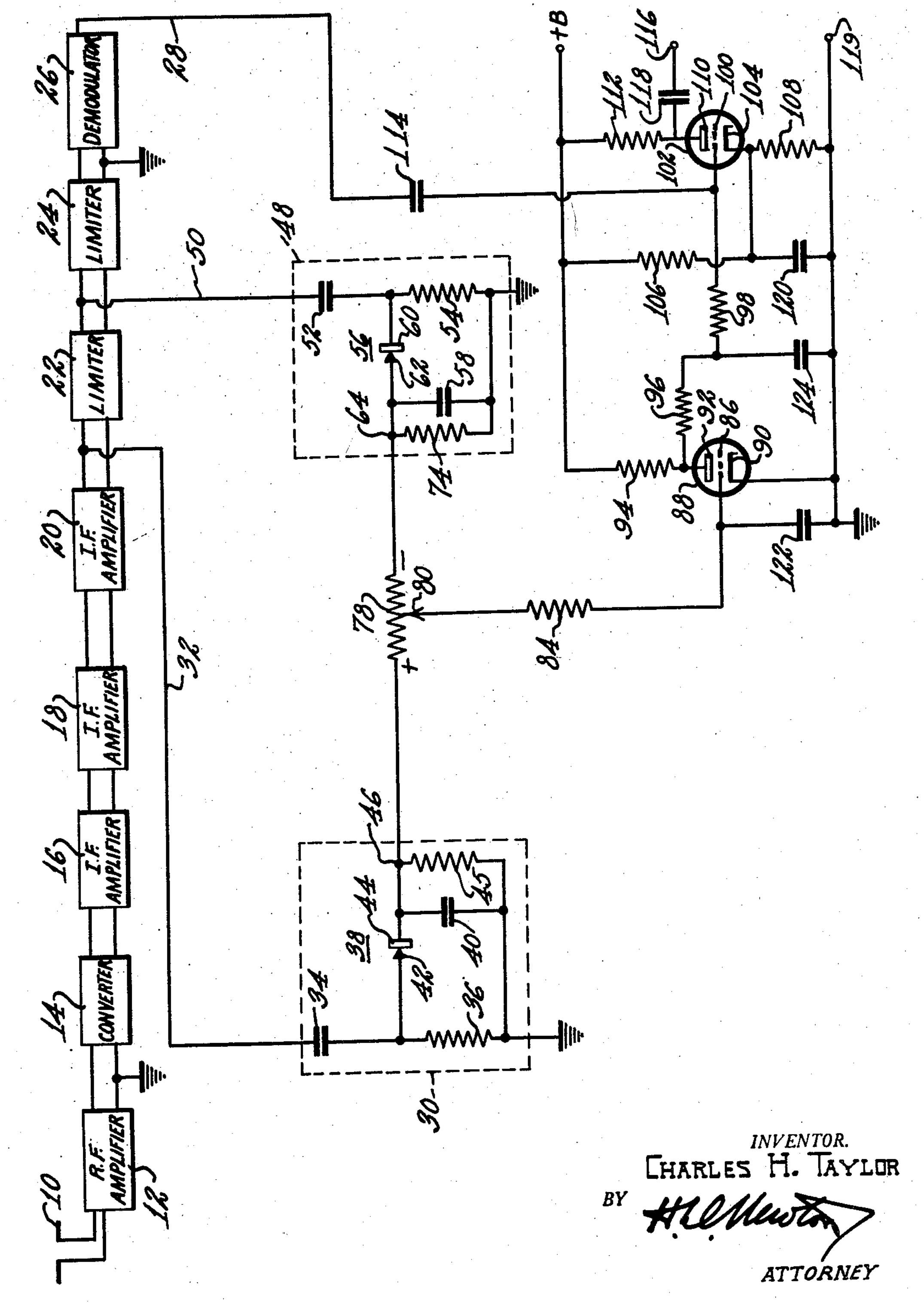
INVENTOR.
CHARLES H. TAYLOR
BY H. C. Newton
ATTORNEY United States Patent Office 2,830,177

Patented Apr. 8, 1958

2,830,177

SIGNAL RECEIVER MUTING CIRCUITS

Charles H. Taylor, Haddonfield, N. J., assignor to Radio Corporation of America, a corporation of Delaware Application April 28, 1955, Serial No. 504,409

5 Claims. (Cl. 250—20)

This invention relates to signal receiver muting circuits, and more particularly to a muting or interstation noise suppressor circuit for a frequency modulation receiver.

Interstation noise suppression circuits, otherwise known as muting or squelch circuits, that are adapted for use with frequency modulation (FM) receivers are generally controlled by the noise level or signal modulation present at a particular point in the receiver, and are designed to block the signal channel of the receiver when the noise at that point exceeds a predetermined value or unblock the signal channel if the modulation exceeds a predetermined value. Such muting circuits may have a tendency to alternately block and open the receiver when tuned to weak signals near the threshold of muting operation.

Accordingly, it is one of the objects of this invention to provide an improved muting or squelch circuit for a frequency modulation receiver which is operated by the difference between the signal-to-noise ratios of the receiver before and after partial limiting of the signal.

It is another object of this invention to provide an improved muting or squelch circuit for a frequency modulation receiver that minimizes the tendency to alternately block and unblock the receiver signal channel at low signal levels.

These and other objects of the invention are achieved in general, by developing two unidirectional voltages responsive to the amplitude of the signal and noise at two points in the signal channel, one point being the I. F. signal before limiting the other I. F. signal after at least partial limiting. The unidirectional voltages from the two points are compared and combined to produce a resultant voltage that is used to control the passage of the audio signals of the receiver.

However, the invention will be best understood when the following description is read in connection with the accompanying drawing, the sole figure of which is a schematic circuit diagram of a signal receiver having a muting circuit embodying the invention.

Referring now to the drawing, a frequency modulation receiver includes a balanced antenna 10 that intercepts frequency modulated radio signals and applies them to a radio frequency amplifier 12. The signals are amplified in the radio frequency amplifier 12 and converted in the converter circuit 14 to an intermediate frequency (I. F.) signal. The I. F. signal is in turn amplified in the three intermediate frequency amplifiers 16, 18 and 20. The signal is limited by the limiters 22 and 24 and demodulated in the demodulator 26. The audio frequency signals or other modulating signals thus appear in the output lead 28 of the demodulator 26. This represents a well known form of frequency modulation receiver system.

In accordance with the invention, two sampling points in the channel are selected and the signal and noise at these points are detected and combined to provide a control voltage to block or unblock an audio frequency amplifier in the desired manner. In the present example, the sampling points chosen are at the input of the first limiter 22 and the input of the second limiter 24.

A first AM peak detector circuit 30 is connected by a lead 32 to the input circuit of the first limiter 22. The peak detector 30 comprises a coupling capacitor 34 connected in series with a large input resistor 36 to ground for the receiver. A diode rectifier 38 is connected in series with a capacitor 40 across the resistor 36, with the anode 42 of the diode connected to the resistor 36 and the cathode 44 to the capacitor 40. A discharge resistor 45 is shunted across the capacitor 40 and the time constant of the R-C combination is made to follow the amplitude modulation of the carrier wave. It will be noted that the diode is poled so that the cathode 44 is connected nearest to the ground. Therefore, the positive wave of the intermediate frequency voltage, including any noise present in the signal, will be detected, causing a positive unidirectional voltage proportional to the strength of the signal plus noise to appear at the output terminal 46 of the peak detector 30.

A second peak detector 48 similar to the first detector 30 is connected by a lead 50 to the input circuit of the second limiter 24. The second detector 48 again includes a coupling capacitor 52 connected in series with a large input resistor 54 to ground, and a diode 56 in series with a capacitor 58 is shunted across the resistor 54. A discharge resistor is connected in shunt or parallel with the capacitor 58. It will be noted, however, that the cathode 60 of the diode 56 is connected to the resistor 54 and the anode 62 is connected to the shunting capacitor 58. The second diode 56 is thus poled oppositely from the diode 38 of the first AM detector and since its anode is connected nearest ground, the negative peaks of the I. F. wave, including whatever noise is left after limiting, will be detected and a negative unidirectional voltage proportional to the strength of the signal plus noise will appear at the ouput terminal 64 of the second peak detector 48.

A potentiometer 78 is connected between the output terminals 46 and 64 of the first and second AM detectors, respectively, and the voltage difference between the AM peak detector terminals 46 and 64 will thus appear across it. A tap 80 on the potentiometer 78 will then have a voltage with respect to ground that is determined by its position on the potentiometer 78 and by the voltages on the output terminals 46 and 64 of the detectors 30 and 48.

The voltage appearing between tap 80, on the resistor 78 and ground is connected through an isolating resistor 84 to the grid 86 of a direct coupled amplifier gate tube 88. The cathode 90 of the gate tube 88 is connected directly to ground and the anode 92 of the tube 88 is connected to a source of operating voltage, +B, positive with respect to ground, through a load resistor 94.

The voltage appearing on the anode 92 of the gate tube 88 is coupled through the coupling resistors 96 and 98 to the grid 100 of an audio amplifier tube 102. The cathode 104 of the audio amplifier tube 102 is biased, at the no signal condition, to cut off the tube 102 by being connected to the junction of a pair of voltage divider resistors 106 and 108 connected between the voltage source, +B, and ground. The anode 110 of the audio amplifier tube 102 is connected to the voltage source, +B, through a load resistor 112.

Audio frequency signals from the demodulator are conducted through the lead 28 and a coupling capacitor 114 to the grid 100 of the amplifier tube 102, and the amplified signal is then conveyed from the anode 110 to the audio output terminal 116 through a coupling capacitor 118. The output signal is taken between the output terminal 116 and the ground terminal 119. A capacitor 120 connected between the cathode 104 and ground is a bypass capacitor for signal frequencies to prevent degeneration.

A capacitor 122 connected from the grid 86 of the gate tube 88 to ground and a capacitor 124 connected between junction of the coupling resistors 96 and 98 to ground are "thump" filters to minimize an audible thump noise in the sound output of the receiver as the muting circuit comes into operation.

In operation, the first rectifier 30 will produce a first unidirectional voltage that will be positive and proportional to the amplitude of the carrier plus the amplitude of any noise voltage present on the carrier. The second rectifier 48 will produce a second unidirectional voltage that will be negative and also be proportional to the amplitude of the carrier after at least some noise has been eliminated from the carrier by limiting through one stage. If a substantial portion of the noise has been removed in the first limiter there will be very little additional D.-C. voltage as a result of noise at the output of the second detector 48. Thus, the terminal 64, at the output of the second detector, will have proportionately less D.-C. voltage on it than the terminal 46, at the output of the first detector, the difference being due to a difference in noise voltages. The voltage at any given point on the potentiometer 78 to ground is determined by the difference in voltage between the terminals 46 and 64 of the peak detectors 30 and 48, and the difference in voltage between the terminals 46 and 64 is determined by the difference in noise voltage on the carrier before and after limiting. A desirable, strong signal, generally, will be strong enough to be effectively limited, while a weak, noise signal will not be limited. The tap 80 on the potentiometer may be positioned at any point on the potentiometer that will have the proper voltage level to operate the remainder of the muting circuit as will be hereinafter described.

The muting voltage appearing at tap 80 is coupled to the grid 86 of the D.-C. amplifier gate tube 88 and is amplified and coupled through the coupling resistors 96 and 98 to the grid 100 of the audio amplifier tube 102 which is normally biased beyond cut off by connecting its cathode 104 to the junction of the pair of voltage divider resistors 106 and 108 connected between the source of operating voltage, +B, and ground. If a sufficiently large D.-C. signal is coupled through the gate tube 88 to the grid 100 of audio amplifier tube the amplifier tube 102 will be biased into the conducting region, and the audio signals that are demodulated in a demodulator 26 and that appear on the grid 100 can be amplified by the amplifier tube 102 and coupled from its anode 110 through the coupling capacitor 118 to the audio output terminal 116.

For example, with the receiver receiving a minimum signal that is desired to be heard, the tap 80 on the potentiometer 78 is set so that the gate tube 88 applies a bias to the amplifier tube 102 just sufficient to bias it into the conducting region and allow it to amplify. On a larger signal the amplifier tube will be biased further into the conducting region and on a weaker signal it will again be biased into the non-conducting region. The tap 80 on the potentiometer on the threshold control 78 can be set to operate at substantially any desired signal level.

The sampling points, that is, the input circuit of the first limiter and the input circuit of the second limiter, are chosen to give carrier samples that are in the same order of magnitude. Unbalances may be compensated for by adjustment of the position of the tap 80 on the potentiometer 78.

It should be noted that the circuit operates to either cut off or cut on the amplifier tube 102, not on the absolute strength of the carrier level, but on the difference between the carrier level unlimited and limited. Thus this gives an effective control approximately proportional to the signal-to-noise ratio in the receiver. Thus, the muting circuit will not alternatively cut in and out as the absolute level of the carrier varies, for instance, as a result of selective fading, but will operate only when the ratio between the limited and the unlimited signal reaches the desired value. The particular threshold that is desired for the squelch circuit to operate is selected by positioning the tap 80 on the resistor 78 which will apply a larger or smaller signal to the grid of the gate tube for a given receiver signal-to-noise ratio.

A squelch circuit constructed in accordance with the present invention is characterized by an improved muting on the interstation noise in an FM radio receiver and permits the receiver to operate at values of carrier voltage near the threshold level without the muting circuit alternately cutting in and out.

What is claimed is:

1. A muting circuit for a frequency modulation signal receiver having signal limiting means, comprising in combination, means for developing a first unidirectional voltage proportional to the amplitude of a received signal and noise signals thereon at a point in said receiver preceding said limiting means, means for developing a second unidirectional voltage proportional to the amplitude of the signal and any noise signals remaining thereon at a point in said receiver following said limiting means, means for blocking the audio frequency signal output of said receiver, means for combining said first and second unidirectional voltages to produce a resultant unidirectional voltage, and means for applying said resultant unidirectional voltage to said blocking means to unblock said audio frequency channel.

2. A muting circuit in a frequency modulation signal receiver having signal limiting means, comprising in combination, detector means for developing a first unidirectional voltage proportional to the amplitude of a received frequency modulated signal having noise signals appearing as amplitude modulation thereon, a second detector means for developing a second unidirectional voltage proportional to the amplitude of said received signal and amplitude modulated noise signals remaining thereon after at least partial limiting of said signal, means including an amplifier for blocking the audio frequency signal output of said receiver, means for combining said first and second unidirectional voltages to produce a resultant unidirectional voltage, and means for applying said resultant unidirectional voltage to said amplifier to unblock said audio frequency channel.

3. In a frequency modulation signal receiver having signal limiting means an interstation noise suppression circuit, comprising in combination, means including an amplitude modulation detector for developing a first unidirectional voltage proportional to the amplitude of a received signal and noise signals thereon of said receiver before limiting means including a second amplitude modulation detector for developing a second unidirectional voltage proportional to the amplitude of said signal and noise signals remaining thereon after limiting, direct coupled amplifier means for blocking the signal output of said receiver, resistive means responsive to said first and second unidirectional voltages for producing a resultant unidirectional voltage, and means for applying said resultant unidirectional voltage to said amplifier means to unblock said audio frequency channel.

4. A muting circuit for a frequency modulation signal receiver having a limiter amplifier, comprising in combination, means providing a first unidirectional voltage proportional to the amplitude of the signal frequency together with amplitude modulated noise thereon at a point preceding said amplifier, means providing a second unidirectional voltage proportional to the amplitude of the limited signal frequency following said amplifier, means providing a gating circuit to control the passage of the demodulated signals of said receiver, means including a variable resistor for combining said first and said second unidirectional voltages to produce a resultant unidirectional voltage, and means for applying said resultant voltage to said gating circuit as a control voltage therefor.

5. A signal muting circuit for a frequency modulation signal receiver having a limiter amplifier, comprising in combination, a first amplitude modulation detector means for providing a first unidirectional voltage positive with respect to a ground for said receiver proportional to the amplitude of the signal frequency including noise signals thereon at a point preceding said amplifier, a second amplitude modulation detector means for providing a second unidirectional voltage negative with respect to said ground proportional to the amplitude of said signal and noise frequencies after following said limiter amplifier, an audio amplifier for amplifying the demodulated signals of said receiver, means for maintaining said audio amplifier inoperative to pass said demodulated signals, means including a resistor connected between said detector means for combining said first and said second unidirectional voltages to produce a resultant unidirectional voltage, and means for applying said resultant voltage through a direct coupled amplifier to said audio amplifier for rendering said audio amplifier operative to pass said demodulated signals.

References Cited in the file of this patent

UNITED STATES PATENTS

| | | |
|---|---|---|
| 2,343,115 | Noble | Feb. 29, 1944 |
| 2,372,934 | Campbell | Apr. 3, 1945 |
| 2,400,948 | Peterson | May 28, 1946 |